(12) United States Patent
Ji et al.

(10) Patent No.: US 9,624,108 B2
(45) Date of Patent: Apr. 18, 2017

(54) APPARATUS FOR MANUFACTURING NANO-SIZE GRAPHENE-STRUCTURED MATERIAL

(71) Applicant: IDT INTERNATIONAL CO., LTD., Ulsan (KR)

(72) Inventors: Byoung Kyu Ji, Ulsan (KR); Jung Young Choi, Busan (KR); Cheol Min Shin, Ulsan (KR)

(73) Assignee: STANDARDGRAPHENE CO., LTD., Ulsan (KR)

( * ) Notice: Subject to any disclaimer, the term of this patent is extended or adjusted under 35 U.S.C. 154(b) by 116 days.

(21) Appl. No.: 14/411,282

(22) PCT Filed: Oct. 25, 2012

(86) PCT No.: PCT/KR2012/008804
§ 371 (c)(1),
(2) Date: Dec. 24, 2014

(87) PCT Pub. No.: WO2014/003251
PCT Pub. Date: Jan. 3, 2014

(65) Prior Publication Data
US 2015/0147235 A1 May 28, 2015

(30) Foreign Application Priority Data
Jun. 28, 2012 (KR) .................. 10-2012-0070100

(51) Int. Cl.
*A61L 2/00* (2006.01)
*A61L 9/00* (2006.01)
(Continued)

(52) U.S. Cl.
CPC .......... *C01B 31/0446* (2013.01); *B01J 19/10* (2013.01); *B82Y 30/00* (2013.01); *B82Y 40/00* (2013.01);
(Continued)

(58) Field of Classification Search
CPC .................. A61L 2/07; A61L 2/22; A61L 2/26
(Continued)

(56) References Cited

U.S. PATENT DOCUMENTS 2,798,878 A 7/1957 Hummers et al.
7,658,901 B2 2/2010 Prud 'Homme et al.
(Continued)

FOREIGN PATENT DOCUMENTS

KR 10-1053933 B1 8/2011
KR 10-2012-0134685 A 12/2012
(Continued)

OTHER PUBLICATIONS

Int'l. Search report of PCT/KR2012/008804 dated Mar. 8, 2013.
EP Search Report issued in EP App. No. 12879822.0, mailed Feb. 3, 2016.

*Primary Examiner* — Monzer R Chorbaji
(74) *Attorney, Agent, or Firm* — Greer Burns & Crain Ltd.

(57) ABSTRACT

There is provided an apparatus for preparing a graphene-structured material. The apparatus includes a supply hopper configured to supply graphite oxide; a supply line of which an end is connected to a lower end of the supply hopper; a reducing atmosphere gas supply unit connected to a side of the supply line; a vertical fluidized bed furnace of which a lower part is connected to another end of the supply line and configured to reduce the supplied graphite oxide with thermal-expansion; a discharge line of which an end is connected to an upper part of the vertical fluidized bed furnace; a vibrating type vertical micro filter connected to an opening portion on a side of the discharge line; a vacuum pump connected to the vertical micro filter; and a collector positioned under the vertical micro filter and connected to another end of the discharge line.

9 Claims, 2 Drawing Sheets

(51) Int. Cl.
    *C01B 31/04*     (2006.01)
    *C01B 31/02*     (2006.01)
    *B82Y 30/00*     (2011.01)
    *B82Y 40/00*     (2011.01)
    *B01J 19/10*     (2006.01)

(52) U.S. Cl.
    CPC ............ *C01B 31/02* (2013.01); *C01B 31/04* (2013.01); *C01B 31/0476* (2013.01)

(58) Field of Classification Search
    USPC .................... 422/292, 306–307; 252/511
    See application file for complete search history.

(56) References Cited

U.S. PATENT DOCUMENTS

| | | |
|---|---|---|
| 7,785,492 B1 | 8/2010 | Jang et al. |
| 2008/0048152 A1 | 2/2008 | Jang et al. |
| 2010/0222482 A1 | 9/2010 | Jang et al. |
| 2011/0114897 A1* | 5/2011 | Aksay .................. B82Y 30/00 252/511 |

FOREIGN PATENT DOCUMENTS

| | | |
|---|---|---|
| KR | 10-1337970 B1 | 12/2013 |
| WO | WO 2011/019095 A1 | 2/2011 |
| WO | WO 2011/019184 A2 | 2/2011 |

\* cited by examiner

APPARATUS FOR MANUFACTURING NANO-SIZE GRAPHENE-STRUCTURED MATERIAL

This is a National Phase Application filed under 35 U.S.C. §371, of International Application No. PCT/KR2012/008804, filed Oct. 25, 2012, which claims the benefits of Korean Patent Application No. 10-2012-0070100 filed Jun. 28, 2012. The entire disclosure of the prior application is incorporated herein by reference in its entirety.

TECHNICAL FIELD

The present disclosure relates to an apparatus for manufacturing a nano-size graphene-structured material by applying a thermal shock to graphite oxide.

BACKGROUND ART

Graphene has a two-dimensional carbon nano structure recently discovered and is formed in a single planar sheet of $sp^2$-bonded carbon atoms in a honeycomb crystal lattice. A shape of the graphene is the same as that of fully exfoliated graphite. Graphite has a laminated structure of honeycomb crystal lattices.

In 2004, Professor Andre Geim et al. from the University of Manchester first mechanically exfoliated graphene from graphite by using "Scotch tape method" and found excellent electric conductivity of graphene through the study of a quantum hall effect by using the exfoliated graphene. Longitudinal scission of a carbon nanotube makes a graphene structure and infinite enlargement of a wall diameter makes a carbon nanotube similar to graphene. Therefore, electrical, thermal, and mechanical properties of graphene are expected to be comparable to those of carbon nanotubes. In 2008, James Hone et al., researchers from Colombia University, confirmed superior strength of graphene. In the same year, Alexander Balandin et al., researchers from University of California, Riverside, measured thermal conductivity of graphene as 5300 pW/mpK, which is double that of carbon nanotubes.

For preparation of graphene, mechanical exfoliation of graphite crystals as carried out by Professor Andre Geim et al., epitaxial growth on substrates, hydrazine reduction on graphite oxide sheet, chemical vapor deposition, and cutting nanotubes in a solution of potassium permanganate and sulfuric acid have been known but none of them go beyond laboratory preparation levels.

On the other hand, a method of producing expanded graphite, a shape of which is worm-like or accordion-like, by intercalating graphite flakes between graphite crystal layers by adding acids to the graphite flakes and adding a thermal shock thereto has been known since long before. Such worm-like expanded graphite is used as a filler or compression-processed to be used as a sheet having anisotropic conductivity. Such expanded graphite resulting from loose bonding between layers of part of graphite is inferior to graphene in physical properties and its particulate size is much bigger than graphene.

As a method for preparing graphite oxide, there has been known a Staudenmaier method in which graphite powder reacts with a sulfuric acid, a fuming nitric acid, and potassium perchlorate for days to produce graphite oxide. Further, it is described in U.S. Pat. No. 2,798,878 that Hummers shortened a reaction time by using a sulfuric acid, sodium nitrate, and potassium permanganate as oxidants. A reaction of mixing a sulfuric acid, sodium nitrate, and potassium permanganate together is an exothermic reaction and during the mixing reaction, $Mn_2O_7$ produced by a reaction between a sulfuric acid and potassium permanganate may cause explosion at about 55° C. or more. Thus, in this method, graphite oxide in a very small amount can be prepared only by a batch process and there is a limit on mass production of graphite oxide. However, in Korean Patent Application No. 2010-76871, some of the present inventors have suggested a method for continuously preparing graphite oxide using a micro reactor in which multiple micro channels each having a diameter of several μm to several mm and with a residence time of several minutes to several days are connected to each other. Further, in Korean Patent Application No. 2011-53777 which is a pending application filed by the present inventors and has not yet been laid open, there have been suggested a preparing apparatus with improved efficiency in which a tube reactor using ultrasonic waves is combined with a continuous stirred tank reactor.

In Korean Patent Application No. 2010-76871 and its Divisional Application No. 2011-24855, the present inventors describes an apparatus in which a prepared graphite oxide is dropped in a vertical fluidized bed furnace and floating graphene is separately collected by a cyclone. However, in such an apparatus, a drop of graphite oxide and a rise of graphene are carried out concurrently, and, thus, it is difficult to uniformly apply heat with low efficiency.

DISCLOSURE OF INVENTION

Technical Problem

The present disclosure provides an apparatus for economically mass-producing a material having a structure and properties of graphene by adding a thermal shock to graphite oxide.

In particular, the present disclosure provides an apparatus for producing a material having a structure and properties of graphene by adding a thermal shock to graphite oxide oxidized with an oxidizer under ultrasonication.

Solution to Problem

In accordance with an illustrative embodiment of the present disclosure, there is provided an apparatus for preparing a graphene-structured material, the apparatus includes a supply hopper configured to supply graphite oxide; a supply line of which an end is connected to a lower end of the supply hopper; a reducing atmosphere gas supply unit connected to a side of the supply line; a vertical fluidized bed furnace of which a lower part is connected to another end of the supply line and configured to reduce the supplied graphite oxide with thermal-expansion; a discharge line of which an end is connected to an upper part of the vertical fluidized bed furnace; a vibrating type vertical micro filter connected to an opening portion on a side of the discharge line; a vacuum pump connected to the vertical micro filter; and, a collector positioned under the vertical micro filter and connected to another end of the discharge line. In this case, desirably, the supply hopper is sealed.

In the present disclosure, a graphene-structured material is a mixture of single-layered graphene and multiple-layered graphene and includes exfoliated graphite having a surface area ranging from about 10 m²/g to about 2600 m²/g, for example, from about 50 m²/g to about 2600 m²/g, from about 100 m²/g to about 2600 m²/g, from about 150 m²/g to about 2600 m²/g or from about 200 m²/g to about 2600 m²/g, and desirably, from about 200 m²/g to about 2600 m²/g. If the same amount of the material is uniformly dispersed, as a surface area is increased, improvement in conductivity becomes greater. Such graphene has a peak in 2θ of around about 12° in a range of from about 12° to about 14°, for example, from about 12° to about 13° or from about 13° to about 14° according to an XRD analysis on graphite when 2θ is about 26.5°. It can be determined that as a peak becomes minimized at, desirably, about 12.7° according to an XRD analysis on graphite oxide, an amount of exfoliated graphite is increased. In particular, the present disclosure is suitable to prepare a graphene-structured material with graphite oxide prepared in accordance with a method described in Korean Patent Application No. 2011-53777 which is a pending application filed by the present inventors and having a carbon/oxygen ratio of from about 1/1 to about 5/1 as an analysis result of an elemental analyzer and a peak in 2θ of around about 12° in a range of from about 12° to about 14°, for example, from about 12° to about 13° or from about 13° to about 14°, and desirably, a maximum peak at about 12.7°, according to an XRD analysis.

Such graphite oxide can be exfoliated rapidly, uniformly, and sufficiently by intercalating an oxidizer between layers of graphite under ultrasonication and adding a thermal shock thereto. In the present disclosure, if a carbon/oxygen ratio of graphite oxide is smaller than about 1/1, small graphene can be obtained in the process of exfoliating, and if the carbon/oxygen ratio is greater than about 5/1, an amount of exfoliated graphene is decreased. In both cases, physical properties of graphene become degraded. In the graphite oxide, a functional group such as a hydroxyl group, a carboxylic acid group, and an epoxy group is formed at each layer through an oxidation reaction. Thus, a gap between the layers of the graphite oxide is increased from about 3.4 Å, which is the gap in graphite powder as a source, to about 7 Å. The graphite oxide does not have a significant peak except a trace in 2θ of around about 26° which is one of characteristics of graphite powder but has a peak in 2θ of around about 12° in a range of from about 12° to about 14°, for example, from about 12° to about 13° or from about 13° to about 14°, and desirably, at about 12.7° according to an XRD analysis.

In accordance with the present disclosure, graphite oxide is completely exfoliated by a thermal shock and transformed into a graphene-structured material while rising in a vertical fluidized bed furnace. The vertical fluidized bed furnace can be heated by a conventional method using a heater or by a method using microwaves. A temperature within the vertical fluidized bed furnace may be maintained in a range of from about 300° C. to about 1200° C., for example, from about 350° C. to about 1200° C., from about 400° C. to about 1200° C., from about 450° C. to about 1200° C. or from about 500° C. to about 1200° C., and desirably, from about 500° C. to about 1200° C.

The atmosphere gas supply unit supplies an inert carrier gas including nitrogen or argon. If necessary, the inert carrier gas may be mixed with a reducing gas such as a hydrogen gas, a methane gas, and/or carbon monoxide or may be mixed with a liquid, such as alcohol containing ethanol, for generating a reducing gas.

Graphite oxide flakes are exfoliated by a thermal shock, and only a graphene-structured material sufficiently exfoliated rides a rising air current by an adjusted air current to discharge via a discharge line connected to an upper part of the vertical fluidized bed furnace. The graphene-structured material discharged through the discharge line is moved from the discharge line along a negative pressure of the vacuum pump and is collected by a vertical micro filter. Then, the graphene-structured material is dropped down by a vibrator provided to the vertical micro filter and collected by a collector.

Advantageous Effects of Invention

In accordance with the present disclosure, it is possible to continuously mass-produce nanoscale graphene by continuously supplying and reducing graphite oxide with thermal-expansion. Further, in accordance with the present disclosure, during a preparing process, the graphene-structured material has physical properties comparable to those of a carbon nanotube and easily obtains superior dispersibility as compared with a carbon nanotube having low dispersibility due to a small amount of a remaining functional group such as a carboxyl group or a hydroxyl group by controlling reduction. Therefore, the graphene-structured material can be applied to various fields such as a polymer composite material, a filler, a secondary battery, a transistor, a hydrogen gas reservoir, a super capacitor, a top gate, a biosensor, and the like based on the physical properties including high thermal conductivity, high electric conductivity, high strength, high specific surface area, high flexibility, and the like.

BEST MODE FOR CARRYING OUT THE INVENTION

Figure 1:
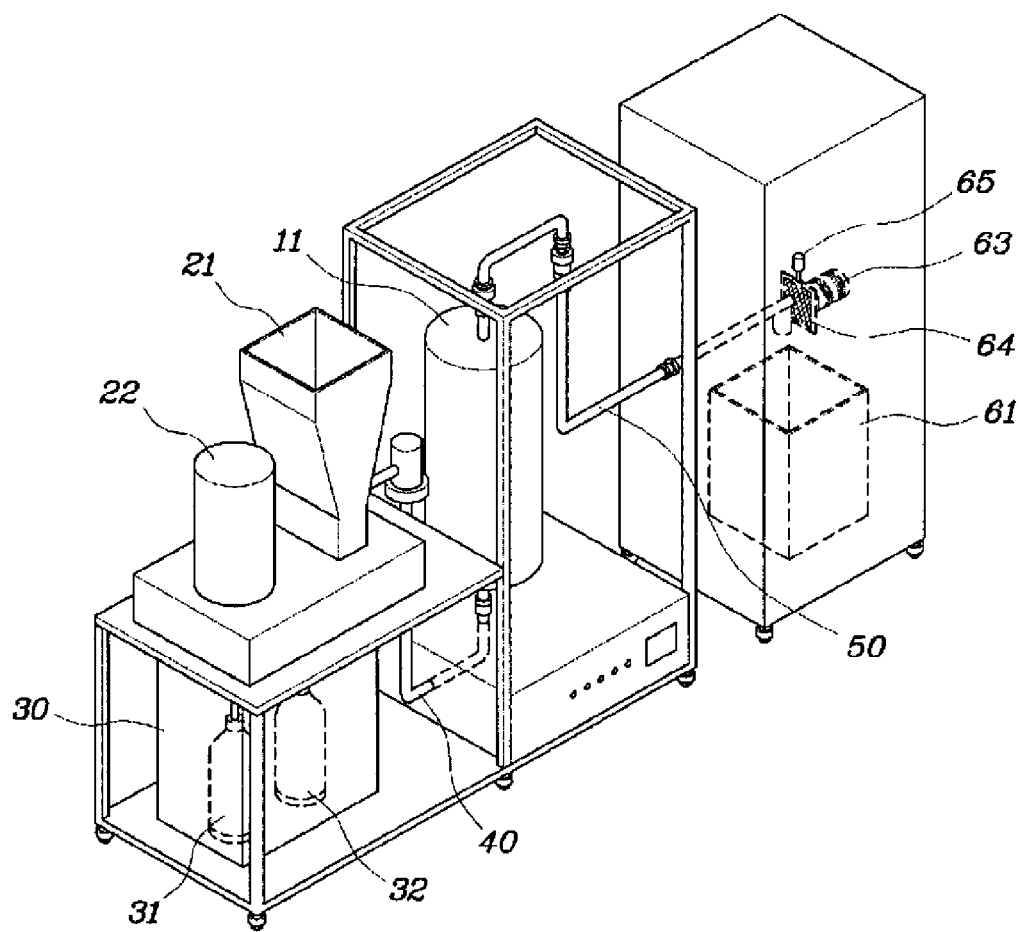
FIG. 1 provides a perspective view of an apparatus for preparing a graphene-structured material by exfoliating graphite oxide with a thermal shock in a vertical fluidized bed furnace in accordance with an illustrative embodiment of the present disclosure.

Hereinafter, illustrative embodiments of the present disclosure will be described in detail with reference to FIGS. 1 and 2.

Graphite oxide is supplied by a screw feeder 22 through a supply line 40 of a supply hopper 21 for supplying graphite oxide powder to a lower part of a vertical fluidized bed furnace 11 heated by a heater 12.

The graphite oxide supplied to the supply hopper 21 has a carbon/oxygen ratio ranging from about 1/1 to about 5/1 as an analysis result of an elemental analyzer and a peak in 2θ of around about 12° in a range of from about 12° to about 14°, for example, from about 12° to about 13° or from about 13° to about 14°, and desirably, a maximum peak at about 12.7°, according to an XRD analysis.

If a carbon/oxygen ratio of the graphite oxide is smaller than about 1/1, small graphene can be obtained in the process of exfoliating, and if the carbon/oxygen ratio is greater than about 5/1, an amount of exfoliated graphene is decreased. In both cases, physical properties of graphene become degraded. If the carbon/oxygen ratio of the graphite oxide is in the range of from about 1/1 to about 5/1, the graphite oxide can be exfoliated rapidly and uniformly by intercalating an oxidizer between layers of graphite under ultrasonication and adding a thermal shock thereto.

Further, in the graphite oxide, a functional group such as a hydroxyl group, a carboxylic add group, and an epoxy group is formed at each layer through an oxidation reaction. Thus, a gap between the layers of graphite powder is increased from about 3.4 Å, which is the gap of graphite powder as a source, to about 7 Å and the graphite oxide does not have a significant peak except a trace in 2θ of around about 26° which is one of characteristics of graphite powder but has a peak in 2θ of around about 12° in a range of from about 12° to about 14°, for example, from about 12° to about 13° or from about 13° to about 14°, and desirably, at about 12.7° according to an XRD analysis.

Desirably, the supply hopper 21 is sealed in order to prevent the graphite oxide from a reaction with the air.

An inert carrier gas 31 and a reducing gas 32 are supplied to a side of the supply line 40 by an atmosphere gas supply unit 30.

The inert carrier gas 31 allows the graphite oxide powder to smoothly move to the vertical fluidized bed furnace 11 through the supply line 40. In this way, the graphite oxide powder moves along the inert carrier gas 31, and, thus, there is no need to provide a separate device, such as a pump, for moving the graphite oxide powder. In this case, as the inert carrier gas 31, an inert gas is used in order to prevent a reaction with the graphite oxide. By way of example, the inert gas may include nitrogen or argon.

The reducing gas 32 makes an oxidation reaction with the graphite oxide and forms a functional group, such as a hydroxyl group, a carboxylic acid group, and an epoxy group, at each layer of the graphite oxide. Therefore, as described above, a gap between layers of the graphite oxide may be increased from about 3.4 Å to about 7 Å.

Figure 2:
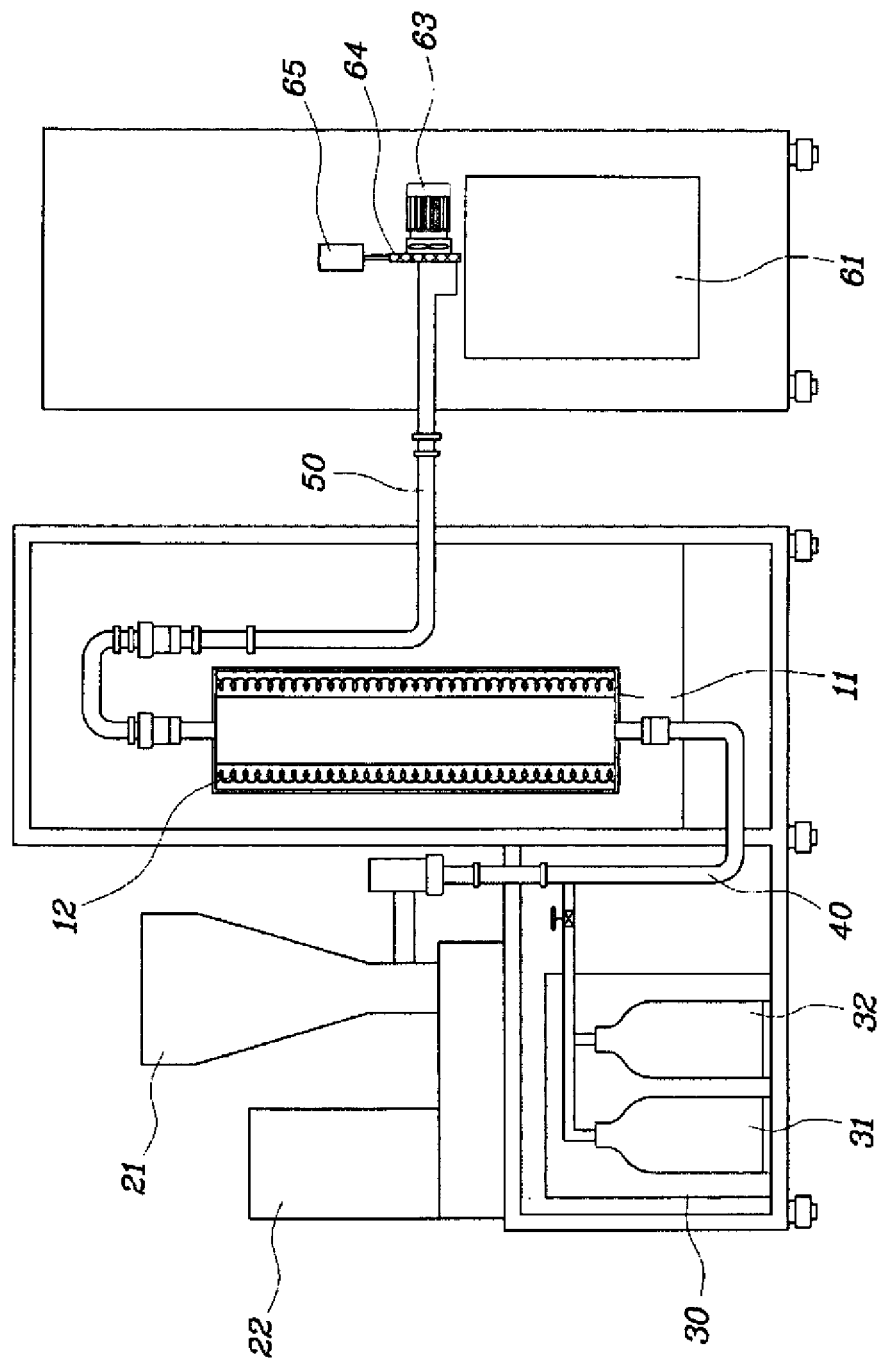
FIG. 2 is a cross-sectional view of the apparatus depicted in FIG. 1.

Referring to FIG. 2, there may be provided a valve between the atmosphere gas supply unit 30 and the supply line 40 to adjust an amount of the inert carrier gas 31 and reducing gas 32 supplied to the supply line 40. By adjusting the amount of the inert carrier gas 31 and reducing gas 32, a speed of a rise of the graphite oxide in the vertical fluidized bed furnace 11 can be adjusted. By adjusting the speed, an amount of graphite oxide to be exfoliated into graphene and an amount of functional groups to be formed between layers of the graphite oxide can be adjusted.

The graphite oxide supplied to the lower part of the vertical fluidized bed furnace 11 is exfoliated by a thermal shock and rises along a rising air current formed in the vertical fluidized bed furnace 11.

In order to add the thermal shock to the graphite oxide, the vertical fluidized bed furnace 11 is heated. The vertical fluidized bed furnace 11 can be heated by a method using a heater or by a method using microwaves.

Further, referring to FIG. 2, desirably, the heater 12 or the like is provided in a height direction of the vertical fluidized bed furnace 11 such that the graphite oxide vertically rising within the vertical fluidized bed furnace 11 can be exfoliated uniformly by the thermal shock.

A temperature within the vertical fluidized bed furnace 11 can be maintained in a range of from about 300° C. to about 1200° C., for example, from about 350° C. to about 1200° C., from about 400° C. to about 1200° C., from about 450° C. to about 1200° C. or from about 500° C. to about 1200° C., and desirably, from about 500° C. to about 1200° C.

Graphite oxide flakes are exfoliated by a thermal shock, and only a graphene-structured material sufficiently exfoliated rides a rising air current by an adjusted air current to discharge via a discharge line 50 connected to an upper part of the vertical fluidized bed furnace 11. The adjusted air current may be formed of the inert carrier gas 31 and reducing gas 32 supplied by the atmosphere gas supply unit 30.

Referring to FIG. 2, the discharge line 50 is connected to an upper part of the vertical fluidized bed furnace 11 and bent downwards to be connected to a collector 61. With this configuration, the discharge line 50 allows the exfoliated graphene-structured material in the vertical fluidized bed furnace 11 to be collected by the collector 61.

Referring to FIG. 2, the discharge line 50 includes an opening portion on one side of a part right above an inlet of the collector 61 and is connected to a vacuum pump 63 through a vertical micro filter 64 directly connected to a vibrator 65.

The vacuum pump 63 serves as a negative pressurizer that applies a negative pressure to the opening portion of the discharge line 50 connected to the vertical micro filter 64 such that the graphene-structured material passing through the discharge line 50 can be collected by the vertical micro filter 64.

To be more specific, as depicted in FIGS. 1 and 2, the discharge line 50 is bent downwards at the upper part of the vertical fluidized bed furnace 11 and horizontally extended to the part right above the inlet of the collector 61. Since the discharge line 50 is horizontally extended to the part right above the inlet of the collector 61 and connected to the vertical micro filter 64, the graphene-structured material can be filtered stably by the vertical micro filter 64 and subsequently collected by the collector 61 through the vibrator 65.

Further, desirably, the vertical micro filter 64 includes filter holes each having a diameter enough to filter out the graphene-structured material.

The graphene-structured material collected by the vertical micro filter 64 due to the negative pressure of the vacuum pump 63 is dropped down due to vibration of the vibrator 65 and collected by the collector 61.

Referring to FIG. 2, desirably, a part of the discharge line 50, the collector 61, the vacuum pump 63, the vertical micro filter 64, and the vibrator 65 are provided in a sealed space so as to prevent the graphene-structured material from a reaction with the air and also prevent foreign substances from being introduced thereto.

In accordance with the present disclosure, it is possible to continuously mass-produce nanoscale graphene by continuously supplying the graphite oxide to the supply hopper 21 and by reducing the graphite oxide with thermal-expansion in the vertical fluidized bed furnace 11.

Further, in accordance with the present disclosure, during a preparing process, the graphene-structured material has physical properties comparable to those of a carbon nanotube and easily obtains superior dispersibility as compared with a carbon nanotube having low dispersibility due to a small amount of a remaining functional group such as a carboxyl group or a hydroxyl group. Therefore, the graphene-structured material can be applied to various fields such as a polymer composite material, a filler, a secondary battery, a transistor, a hydrogen gas reservoir, a super capacitor, a top gate, a biosensor, and the like based on the physical properties including high thermal conductivity, high electric conductivity, high strength, high specific surface area, high flexibility, and the like.

The above description of the illustrative embodiments is provided for the purpose of illustration, and it would be understood by those skilled in the art that various changes and modifications may be made without changing technical conception and essential features of the illustrative embodiments. The scope of the illustrative embodiments is defined by the following claims rather than by the detailed description of the illustrative embodiments. It shall be understood that all modifications and embodiments conceived from the meaning and scope of the claims and their equivalents are included in the scope of the illustrative embodiments.

The invention claimed is:

1. An apparatus for preparing a graphene-structured material, the apparatus comprising:
  a supply hopper configured to supply graphite oxide;
  a supply line of which an end is connected to a lower end of the supply hopper;
  a reducing atmosphere gas supply unit connected to a side of the supply line;
  a vertical fluidized bed furnace of which a lower part is connected to another end of the supply line and configured to reduce the supplied graphite oxide with thermal-expansion;
  a discharge line of which an end is connected to an upper part of the vertical fluidized bed furnace;
  a vertical micro filter connected to an opening portion on a side of the discharge line;
  a vibrator and a vacuum pump connected to the vertical micro filter; and
  a collector positioned under the vertical micro filter and connected to another end of the discharge line,
  wherein the graphene-structured material is discharged through the discharge line from the vertical fluidized bed furnace, collected at the vertical micro filter, and dropped into the collector from a vibration on the vertical micro filter created by the vibrator.

2. The apparatus of claim 1, wherein the graphite oxide is oxidized under ultrasonication and has a carbon/oxygen ratio of from about 1/1 to about 5/1 as an analysis result of an elemental analyzer and a maximum peak in 2θ of from about 12° to about 14° according to an XRD analysis, and the graphene-structured material is a mixture of single-layered graphene and multiple-layered graphene and includes exfoliated graphite having an average surface area ranging from about 200 $m^2/g$ to about 2600 $m^2/g$.

3. The apparatus of claim 1, wherein a temperature within the vertical fluidized bed furnace is maintained in a range of from about 500° C. to about 1200° C.

4. The apparatus of claim 1, wherein the atmosphere gas supply unit supplies an inert carrier gas including nitrogen or argon.

5. The apparatus of claim 1, wherein the atmosphere gas supply unit supplies an inert carrier gas and a reducing gas.

6. The apparatus of claim 5, wherein the reducing gas includes a hydrogen gas, a methane gas, carbon monoxide or alcohol.

7. The apparatus of claim 5, wherein the atmosphere gas supply unit comprises a valve configured to adjust an amount of the inert carrier gas and reducing gas to be supplied to the supply line.

8. The apparatus of claim 1, wherein the vertical fluidized bed furnace is provided in a height direction to continuously apply a thermal shock to the graphite oxide vertically rising in the vertical fluidized bed furnace.

9. The apparatus of claim 1, wherein the discharge line is horizontally connected to the vertical micro filter.

* * * * *